US008031702B2

(12) United States Patent
Koskinen et al.

(10) Patent No.: US 8,031,702 B2
(45) Date of Patent: Oct. 4, 2011

(54) CHARGING CONTROL IN IP MULTIMEDIA SUBSYSTEM

(75) Inventors: Juha-Pekka Koskinen, HML (FI); Anne Narhi, Tampere (FI); Juha R. Vallinen, Nokia (FI); Mika K. Salminen, Pirkkala (FI)

(73) Assignee: Nokia Corporation, Espoo (FI)

( * ) Notice: Subject to any disclaimer, the term of this patent is extended or adjusted under 35 U.S.C. 154(b) by 318 days.

(21) Appl. No.: 11/892,962

(22) Filed: Aug. 28, 2007

(65) Prior Publication Data
US 2008/0056304 A1 Mar. 6, 2008

Related U.S. Application Data

(60) Provisional application No. 60/840,944, filed on Aug. 30, 2006.

(51) Int. Cl.
*H04L 12/66* (2006.01)
(52) U.S. Cl. ............. 370/356; 370/401; 379/114.01; 455/406; 455/445
(58) Field of Classification Search ............ 370/352, 370/356, 401; 379/114.01; 455/406, 445
See application file for complete search history.

(56) References Cited

U.S. PATENT DOCUMENTS

| 2002/0176405 | A1* | 11/2002 | Aijala | 370/352 |
| 2003/0112932 | A1 | 6/2003 | Johnston | |
| 2004/0196816 | A1* | 10/2004 | Koskinen et al. | 370/338 |
| 2004/0229596 | A1* | 11/2004 | Stura et al. | 455/406 |
| 2005/0021351 | A1* | 1/2005 | Koskinen et al. | 705/1 |
| 2005/0091367 | A1* | 4/2005 | Pyhalammi et al. | 709/224 |
| 2005/0136915 | A1* | 6/2005 | Rooke et al. | 455/428 |
| 2005/0177469 | A1* | 8/2005 | Vallinen et al. | 705/29 |
| 2005/0235052 | A1* | 10/2005 | Koskinen et al. | 709/223 |
| 2007/0174400 | A1* | 7/2007 | Cai et al. | 709/206 |
| 2007/0213031 | A1* | 9/2007 | Ejzak et al. | 455/406 |
| 2007/0217354 | A1* | 9/2007 | Buckley | 370/328 |
| 2007/0274490 | A1* | 11/2007 | Hu et al. | 379/201.01 |

FOREIGN PATENT DOCUMENTS

| EP | 1 819 092 A1 | 8/2007 |
| WO | WO 2004/056079 A1 | 7/2004 |
| WO | WO 2006/066481 A1 | 6/2006 |

OTHER PUBLICATIONS

Henrickson, E., "*Private SIP Extension for Mobile Charging Information*", Jun. 2002, pp. 1-11.
Garcia-Martin, M., et al., "*Private Header (P-Header) Extensions to the Session Initiation Protocol (SIP) for the 3rd-Generation Partnership Project (3GPP)*", RFC: 3455, XP003012077, Jan. 2003, pp. 1-34.
3GPP TS 22.101 7.6.0, "*3rd Generation Partnership Project; Technical Specification Group Services and System Aspects Service Aspects; Service Principles (Release 7)*", Jun. 2006, pp. 1-45.
3GPP TR 23.806 V1.4.0, "*3rd Generation Partnership Project; Technical Specification Group Services and System Aspects; Voice Call Continuity between CS and IMS Study (Release 7)*", Aug. 2005, pp. 1-41.

* cited by examiner

*Primary Examiner* — Luat Phung
(74) *Attorney, Agent, or Firm* — Mintz, Levin, Cohn, Ferris, Glovsky and Popeo, P.C.

(57) ABSTRACT

For controlling charging in an Internet Protocol multimedia subsystem, it is detected whether a session initiated in the Internet Protocol multimedia subsystem is associated with a service requiring special charging control, and charging information is added to messages signalling establishment or modification of the session in the Internet Protocol multimedia subsystem in accordance with the detection result.

24 Claims, 4 Drawing Sheets

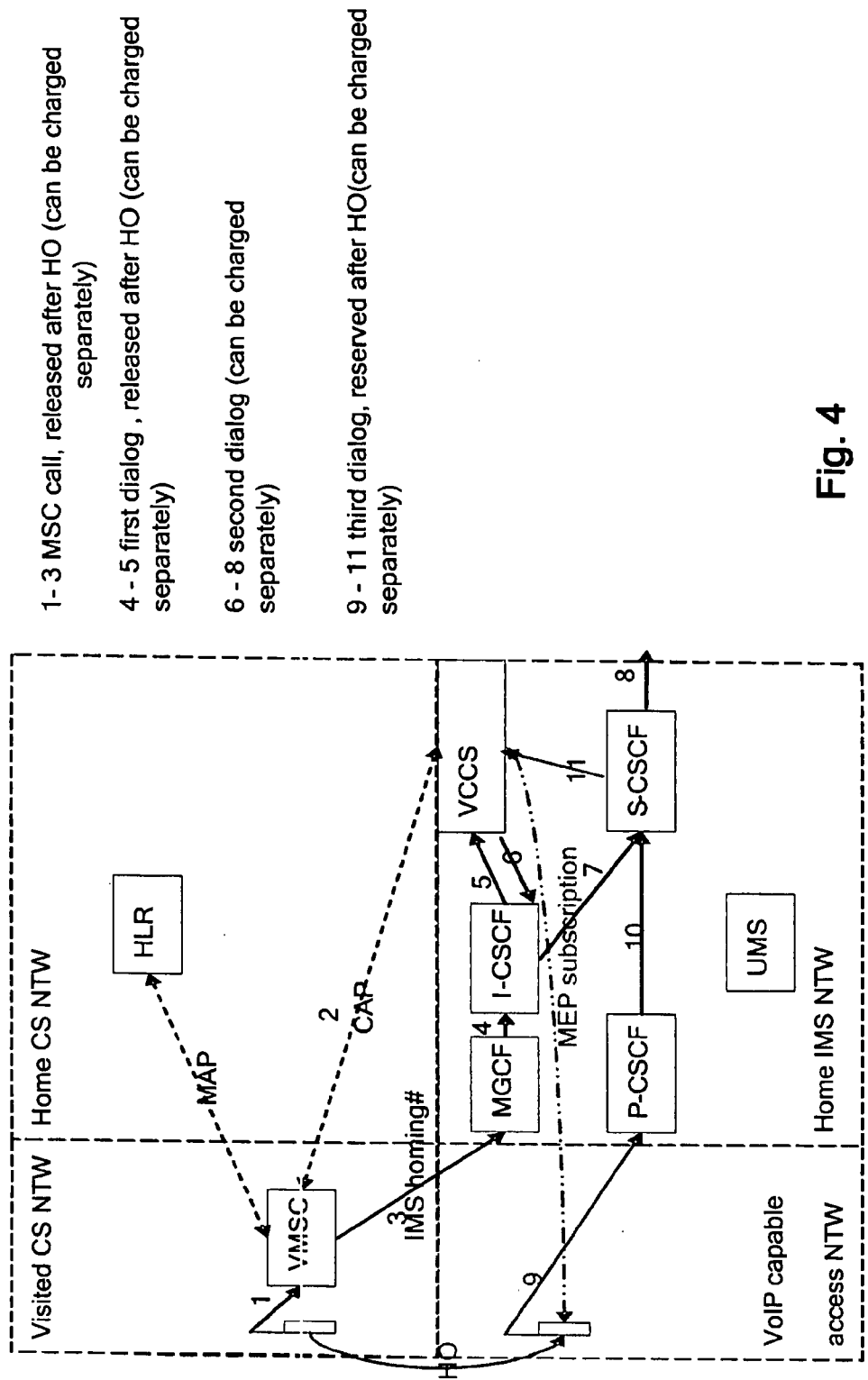

CHARGING CONTROL IN IP MULTIMEDIA SUBSYSTEM

CROSS REFERENCE TO RELATED APPLICATIONS

This application claims priority to and the benefit of U.S. Provisional Patent Application Ser. No. 60/840,944, filed on Aug. 30, 2006. The disclosure of the prior application is hereby incorporated by reference in its entirety.

BACKGROUND OF THE INVENTION

1. Field of the Invention

The present invention relates to a charging control in an IP Multimedia Subsystem (IMS).

2. Description of the Related Art

In IMS, an S-CSCF (Serving Call Session Control Function), AS (Application Server) and MRFC (Media Resource Function Processor) are the entities that are able to perform online charging. The AS and MRFC use an Ro reference point, while the S-CSCF uses an IMS Service Control (ISC) reference point for communicating with an Online Charging System (OCS) or ISC is terminated to IMS GW (GateWay) which uses Ro reference point to OCS as shown in FIG. 1.

A Session Charging Function (SCF) is intended to perform charging according to session resource usage, based on received requests from the S-CSCF/IMS GW via the ISC/Ro reference point. The SCF should be able to control session establishment by allowing or denying a session establishment request after checking the user's account. In addition, the SCF should be able to terminate an existing session when 'the user's account is empty.

Flexible network usage, i.e. combining CS (Circuit Switched), PS (Packet Switched) and IMS networks/systems and related services and handovers, increases charging complexity. This may cause overlapping or double charging. Currently the overlapping charging cannot be avoided. The discarding of overlapping charging can partly be done in a post-processing system if common charging ID is available.

A private extension to SIP in the form of P-Charging-Function-Addresses and P-Charging-Vector headers is known. The former header is used to pass addresses of entities that provide a charging function. The latter header is used to pass charging correlation information. The affected UAs and proxies associated with a dialog or standalone transaction need to know the identities or addresses of the appropriate charging entities. They also need to pass correlation information so that the records generated and sent to the charging entities may be properly associated for a coordinated billing effort.

SUMMARY OF THE INVENTION

The present invention has been devised to avoid double or overlapping charging in combined network usage, in particular when the IMS is used in combination with CS/PS networks.

According to the invention, for controlling charging in an Internet Protocol multimedia subsystem, it is detected whether a session initiated in the Internet Protocol multimedia subsystem is associated with a service requiring special charging control, and charging information is added to messages signalling establishment or modification of the session in the Internet Protocol multimedia subsystem in accordance with the detection result.

According to the invention, a method and a network node for controlling charging, and a method and a network node for performing charging are provided.

The present invention can also be implemented as a computer program product.

According to an aspect of the present invention there is provided a network node for controlling charging in an Internet Protocol multimedia subsystem, the network node comprising:

means for detecting whether a session initiated in the Internet Protocol multimedia subsystem is associated with a service requiring special charging control; and means for adding charging information to messages signalling establishment or modification of the session in the Internet Protocol multimedia subsystem in accordance with the detection result.

The means for detecting may comprise detecting whether a session initiated in the Internet Protocol multimedia subsystem is associated with a call that is switched by an entity of a network domain different from that of the Internet Protocol multimedia subsystem.

The network node may further comprise means for performing charging in accordance with the detection result.

The charging information may comprise information for avoiding charging of the session in the Internet Protocol multimedia subsystem.

The charging information may comprise parameters for controlling charging of the call.

The charging information may comprise Internet Protocol multimedia subsystem service charging information.

The charging information may comprise reverse charging information.

According to another aspect of the present invention there is provided a network node for performing charging in an Internet Protocol multimedia subsystem, the network node comprising:

means for detecting that a received message which signals establishment or modification of a session in the Internet Protocol multimedia subsystem includes charging information; and means for performing charging in accordance with the charging information.

According to a further aspect of the present invention there is provided a method of controlling charging in an Internet Protocol multimedia subsystem, the method comprising:

a step of detecting whether a session initiated in the Internet Protocol multimedia subsystem is associated with a service requiring special charging control; and a step of adding charging information to messages signalling establishment or modification of the session in the Internet Protocol multimedia subsystem in accordance with the detection result.

The step of detecting may comprise detecting whether a session initiated in the Internet Protocol multimedia subsystem is associated with a call that is switched by an entity of a network domain different from that of the Internet Protocol multimedia subsystem.

According to a further aspect of the present invention there is provided a method of performing charging in an Internet Protocol multimedia subsystem, the method comprising:

a step of detecting that a received message which signals establishment or modification of a session in the Internet Protocol multimedia subsystem includes charging information; and a step of performing charging in accordance with the charging information.

According to the present invention there is provided also a computer program product including a program for a processing device, comprising software code portions for performing, when the program is run on the processing device:

detecting whether a session initiated in an Internet Protocol multimedia subsystem is associated with a service requiring special charging control; and adding charging information to messages signalling establishment or modification of the session in the Internet Protocol multimedia subsystem in accordance with the detection result.

According to another aspect of the present invention there is provided a computer program product including a program for a processing device, comprising software code portions for performing, when the program is run on the processing device:

detecting that a received message which signals establishment or modification of a session in an Internet Protocol multimedia subsystem includes charging information; and performing charging in accordance with the charging information.

The computer program product may comprise a computer-readable medium on which the software code portions are stored.

The program may be directly loadable into an internal memory of the processing device.

According to an embodiment of the invention, charging information for avoiding overlapping charging is transferred in SIP signalling.

According to an embodiment of the invention, a network node for controlling charging in an internet protocol multimedia subsystem is provided, the network node, comprising:

a detecting block configured to detect whether a session initiated in the internet protocol multimedia subsystem is associated with a service requiring a special charging control; and an adding block configured to add charging information to messages signaling establishment or modification of the session in the internet protocol multimedia subsystem in accordance with a detection result.

According to an embodiment of the invention, the adding block is further configured to detect whether a session initiated in the internet protocol multimedia subsystem is associated with a call that is switched by an entity of a network domain different from that of the internet protocol multimedia subsystem.

According to an embodiment of the invention, the network node further comprises:

a charging block configured to perform a charging in accordance with the detection result.

According to an embodiment of the invention, the adding block is further configured to add charging information comprising information for avoiding charging of the session in the internet protocol multimedia subsystem.

According to an embodiment of the invention, the adding block is further configured to add charging information comprising parameters for controlling charging of a call.

According to an embodiment of the invention, the adding block is further configured to add charging information comprising internet protocol multimedia subsystem service charging information.

According to an embodiment of the invention, the adding block is further configured to add charging information comprising reverse charging information.

According to an embodiment of the invention, the detecting block is further configured to detect the session initiated in the internet protocol multimedia subsystem being associated with a voice call continuity service requiring the special charging control.

According to an embodiment of the invention, the adding block is further configured to add charging information comprising parameters introduced to a session initiation protocol signaling.

According to an embodiment of the invention, the adding block is configured to add the charging information for avoiding overlapping charging in a session initiation protocol signaling.

According to an embodiment of the invention, the parameters comprise a p-charging parameters heading.

According to an embodiment of the invention, the network node comprises a voice call continuity server.

According to an embodiment of the invention, a network node for performing charging in an internet protocol multimedia subsystem is provided, the network node comprising:

a detection block configured to detect that a received message which signals establishment or modification of a session in the internet protocol multimedia subsystem comprises charging information; and a charging block configured to perform a charging in accordance with the charging information.

According to an embodiment of the invention, the charging block is configured to perform the charging in accordance with the charging information online.

According to an embodiment of the invention, the network node further comprises:

a sending block configured to send a credit control request to an online charging system.

According to an embodiment of the invention, the network node comprises a serving call session control function.

According to an embodiment of the invention, a method of controlling charging in an internet protocol multimedia subsystem is provided, the method comprising:

detecting whether a session initiated in the internet protocol multimedia subsystem is associated with a service requiring a special charging control; and adding charging information to messages signaling establishment or modification of the session in the internet protocol multimedia subsystem in accordance with a detection result.

According to an embodiment of the invention, a method of performing a charging in an internet protocol multimedia subsystem is provided, the method comprising:

detecting that a received message which signals establishment or modification of a session in the internet protocol multimedia subsystem comprises charging information; and performing a charging in accordance with the charging information.

According to an embodiment of the invention, a computer program embodied on a computer readable medium is provided, the computer program being configured to control a processing device to perform:

detecting whether a session initiated in the internet protocol multimedia subsystem is associated with a service requiring a special charging control; and adding charging information to messages signaling establishment or modification of the session in the internet protocol multimedia subsystem in accordance with a detection result.

According to an embodiment of the invention, a computer program embodied on a computer readable medium is provided, the computer program being configured to control a processing device to perform:

detecting that a received message which signals establishment or modification of a session in an internet protocol multimedia subsystem comprises charging information; and performing a charging in accordance with the charging information.

The computer readable medium may comprise stored software code portions.

The computer program may be configured to be directly loadable into an internal memory of the processing device.

The present invention enables charging control information transfer in cases where charging generation can be overlapping. According to the invention, the charging control information transfer is enabled even for online charging.

BRIEF DESCRIPTION OF THE DRAWINGS

In the following the invention will be described by way of a preferred embodiment thereof referring to the accompanying drawings, in which:

FIG. 4 shows a schematic block diagram illustrating an IMS controlled VCC case according to an implementation example of the invention.

DETAILED DESCRIPTION OF PREFERRED EMBODIMENTS

In case different network domains should work with IMS servers or services in a flexible way, for example in a Voice Call Continuity (VCC) case, double or overlapping charging is a problem. VCC is an IMS service enabling voice call continuity between CS and IMS domains. Typically VCC capability is achieved by connecting WLAN (Wireless Local Area Network) hotspot to IMS networks. In this way GSM subscriber can make calls e.g. at home using WLAN capability between mobile and hotspot device. When subscriber leaves the WLAN coverage area, he/she can make handover to GSM (Global System for Mobile communication) network.

According to the invention, in such combination cases charging information is added to signalling in IMS. According to a preferred embodiment of the invention, a P-Charging-Parameters-header is introduced in SIP (Session Initiation Protocol) signalling which contains charging information used to control charging in complicated interdomain cases.

A control point of a core network adds the charging information to SIP signalling. The charging information can be used by the control point to avoid overlapping charging. The charging information can be converted and included also to ISUP (ISDN (Integrated Services Digital Network) User Part) signalling. An inter-domain service where this mechanism can be used is VCC. In this case the control point is a Voice Call Continuity Server (VCCS).

Figure 1:
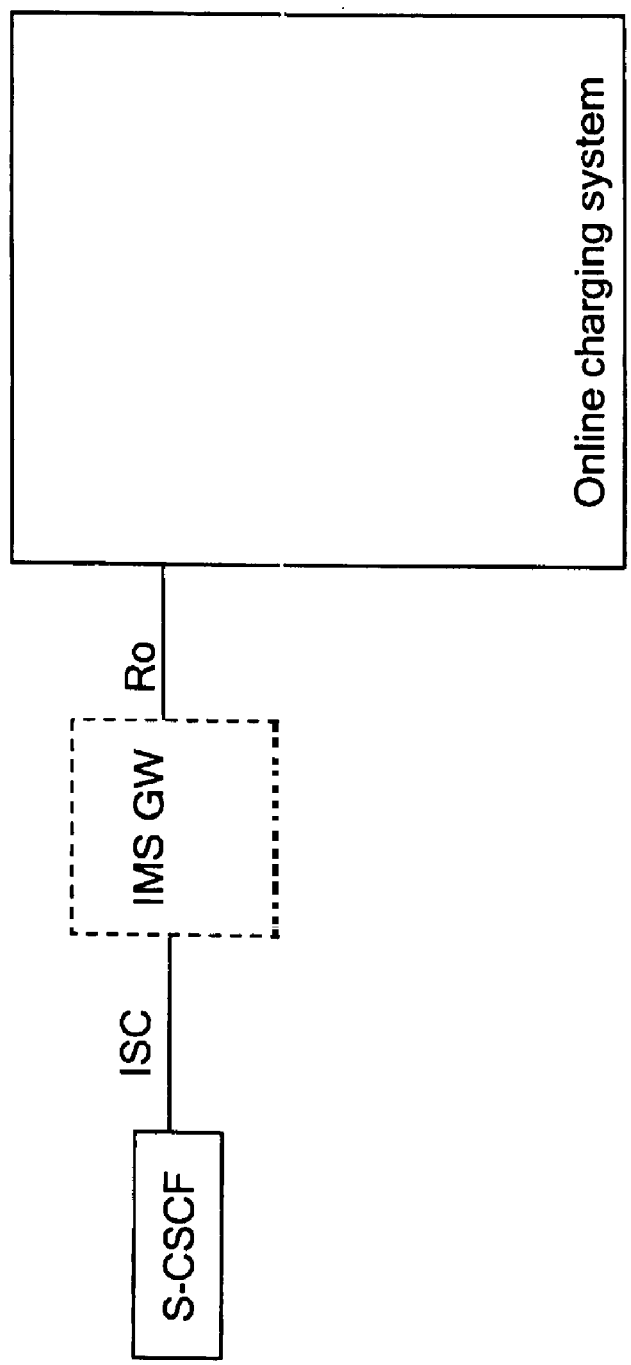
FIG. 1 shows a schematic block diagram illustrating part of an IMS online charging architecture.
Figure 2:
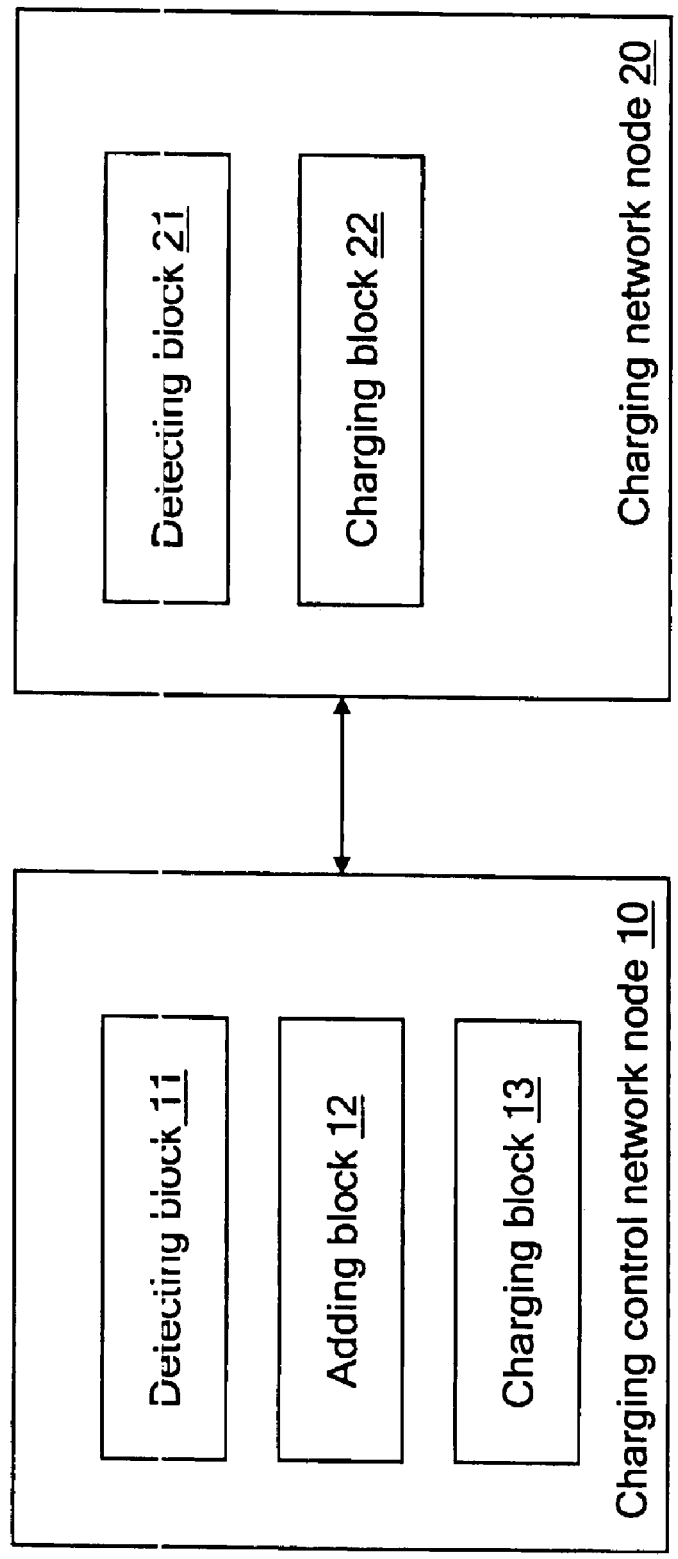
FIG. 2 shows a schematic block diagram illustrating a charging control network node and a charging network node according to the invention.

FIG. 2 shows a schematic block diagram illustrating a charging control network node 10 and a charging network node 20 according to the invention.

The charging control network node 10, which controls charging in an IMS comprises a detecting block 11 and an adding block 12. The detecting block 11 detects whether a session initiated in the IMS is associated with a service requiring special charging control, and the adding block 12 adds charging information to messages signalling establishment or modification of the session in the IMS in accordance with the detection result.

In case of VCC as the service requiring special charging control, the charging control network node 10 comprises a VCCS, and the detecting block 11 may detect whether a session initiated in the IMS is associated with a call that is switched by an entity of a network domain different from that of the IMS, and the adding block 12 adds charging information to messages signalling establishment or modification of the session in the IMS in accordance with the detection result.

On the other hand, the charging network node 20, such as an S-CSCF, which performs charging in IMS comprises a detecting block 21 and a charging block 22. When the detecting block 21 detects that a received message which signals establishment or modification of a session in the IMS includes charging information, the charging block 22 performs charging in accordance with the detected charging information.

The charging control network node 10 may also perform charging and may further comprise a charging block 13 which performs charging also in accordance with the charging information to be added by the adding block 12.

Figure 3:
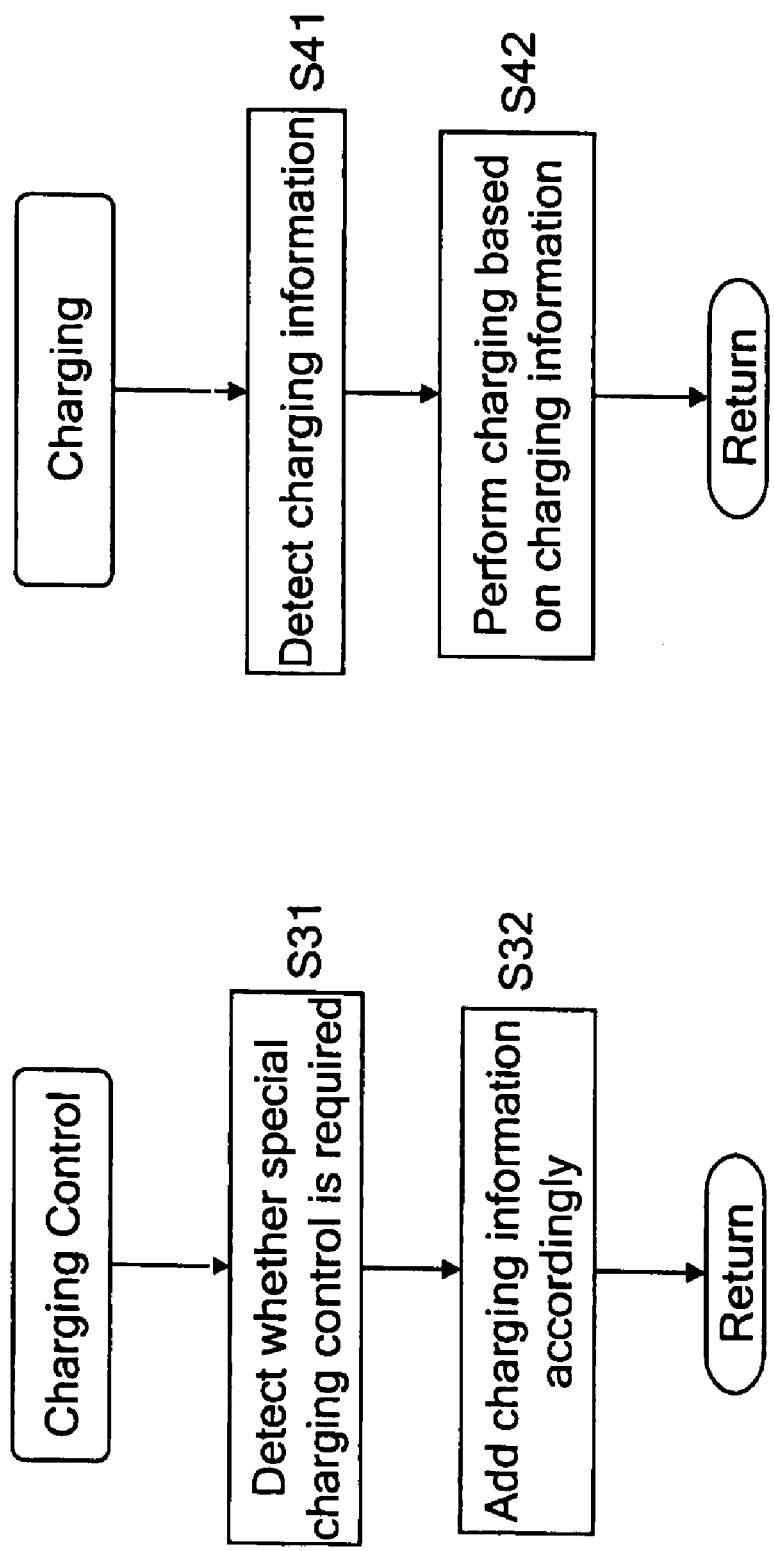
FIG. 3 shows a flow chart illustrating a charging control method and a charging method according to the invention.

FIG. 3 shows a flow chart illustrating a charging control method and a charging method according to the invention.

In the charging control method, in step S31 it is detected whether a session initiated in IMS is associated with a service requiring special charging control. In case of VCC as the service requiring special charging control, it may be detected whether a session initiated in IMS is associated with a call that is switched by an entity of a network domain different from that of IMS, i.e. it is detected whether there is a combination case. In accordance with the detection result, in step S32 charging information is added to messages signalling establishment or modification of the session in IMS.

In the charging method, in step S41 it is detected that a received message which signals establishment or modification of a session in IMS includes charging information. Then, in step S42 charging is performed in accordance with the charging information.

According to the preferred embodiment, a P-Charging-Parameters-header is introduced to SIP signalling. This header may comprise at least one of the following information:

FoC information (Free-of-Charge T(rue)/F(alse));
CAI (Charge Advice Information) elements (e-parameters to control CS charging);
ISCI (IMS Service Charging Information) (identification of different services/servers, e.g. VCCS, and relating charging information e.g. for rating the service); and
CC (Collect Call) information (Reverse Charging).

In the following an implementation example of the invention is described in which the P-Charging-Parameters-header is used in VCC, by referring to FIG. 4.

FIG. 4 shows an IMS controlled VCC case in which a HO (HandOver) of a CS originating call to IMS is carried out.

When a call is initiated by a user equipment in a CS network as a CS network domain, anchoring is done to a VCCS of an IMS network as an IP network domain via a VMSC (Visited Mobile Switching Center) of the CS network, an MGCF (Media Gateway Control Function) of the IMS network and an I-CSCF (Interrogating CSCF) of the IMS network (messages (1) and (3)-(5) in FIG. 4) creating the first SIP dialog to IMS network. The VCCS initiates a second leg, i.e. second SIP dialog, through the I-CSCF and an S-CSCF (messages (6) and (7) in FIG. 4) towards the terminating network of user equipment of the called party. The VMSC communicates with an HLR (Home Location Register) of a home CN network of the user equipment using MAP (Mobile Application Part) like for all originating calls. Information flow between the VMSC and the VCCS is supported by CAP (CAMEL (Customized Application for Mobile network Enhanced Logic) Application Part) (communications (2) in FIG. 4). With that information flow VMSC gets instructions to route the call to the VCCS of the IMS network using IMRN (IP Multimedia Routing Number).

For the initiated call MSC charging is started as usual. Moreover, according to the prior art, charging for the first IMS dialog via MGCF, I-CSCF to VCCS, and charging for the second IMS dialog from VCCS to S-CSCF would be started.

To avoid overlapping charging, according to the invention, the VCCS adds a P-Charging-Parameters-header to SIP signaling. Free-of-Charge (FoC) information as part of the P-Charging-Parameters-header is delivered in messages (6,7) to the I-CSCF and to the S-CSCF, and in an acknowledgement of message (4) to the MGCF if needed. Instead of the FoC information a more detailed charging information, ISCI including VCC service information, can be delivered as part of the P-Charging-Parameters-header in messages (6,7) to the I-CSCF and to the S-CSCF.

In this way the additional IMS charging for the first and the second SIP dialog can be disabled, i.e. set as free-of-charge.

When an HO is made to a Voice over IP capable access network, the MSC charging will stop as usual, when the original call leg in CS network is released. IMS charging is started for the initiated third SIP dialog in IMS network (messages (9) and (10)) as usual for a new session (SIP INVITE).

For online charging of the third SIP dialog in IMS network the S-CSCF sends a CCR (Credit Control Request) (INITIAL_REQUEST) to an OCS (Online Charging System) (after message (10)), the usage of the VCC service can be detected by the OCS only doing analyses based on the called number, which in this case includes PSI (Public Service Identity) information. Only when a CCR (UPDATE_REQUEST) is sent by the S-CSCF (after an acknowledgement of message (11)) to the OCS, a clear indication of the usage of the VCC service, which has been received by the S-CSCF as part of the ISCI in P-Charging-Parameters-header, can be added.

As can bee seen from the above description, according to the invention, the MSC call (messages (1)-(3)), which is released after HO, can be charged separately, the first dialog (messages (4)-(5)), which is released after HO, can be charged separately, the second dialog (messages (6)-(8)) can be charged separately, and the third dialog (messages (9)-(11)) which is reserved after HO, can be charged separately.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A network node comprising:
a detecting block configured to detect whether a session initiated in an internet protocol multimedia subsystem is associated with a service requiring a special charging control, wherein detecting the session further comprises detecting whether the session is switched by an entity of a network domain other than the internet protocol multimedia subsystem; and
an adding block configured to add charging information to messages signaling establishment or modification of the session in the internet protocol multimedia subsystem in accordance with a detection result, at least one of the messages comprises free of charge information and at least one other of the messages comprises information to include a charge, the at least one of the messages with the free of charge information causing at least one network node receiving the message to disable charging functions for the session by the at least one network node.

2. The network node according to claim 1, wherein the adding block is further configured to detect whether a session initiated in the internet protocol multimedia subsystem is associated with a call that is switched by an entity of a network domain different from that of the internet protocol multimedia subsystem.

3. The network node according to claim 1, further comprising: a charging block configured to perform a charging in accordance with the detection result.

4. The network node according to claim 1, wherein the adding block is further configured to add charging information comprising information for avoiding charging of the session in the internet protocol multimedia subsystem.

5. The network node according to claim 1, wherein the adding block is further configured to add charging information comprising parameters for controlling charging of a call.

6. The network node according to claim 1, wherein the adding block is further configured to add charging information comprising internet protocol multimedia subsystem service charging information.

7. The network node according to claim 1, wherein the adding block is further configured to add charging information comprising reverse charging information.

8. The network node according to claim 1, wherein the detecting block is further configured to detect the session initiated in the internet protocol multimedia subsystem being associated with a voice call continuity service requiring the special charging control.

9. The network node according to claim 5, wherein the adding block is further configured to add charging information comprising parameters introduced to a session initiation protocol signaling.

10. The network node according to claim 1, wherein the adding block is configured to add the charging information for avoiding overlapping charging in a session initiation protocol signaling.

11. The network node according to claim 9, wherein the parameters comprise a p-charging parameters heading.

12. The network node according to claim 1, the network node comprising a voice call continuity server.

13. A network node comprising:
a detection block configured to detect that a received message which signals establishment or modification of a session in an internet protocol multimedia subsystem comprises charging information, the received message being one of a plurality of messages signaling establishment or modification of the session, the charging information representative of a special charging control for the session when the session is switched by an entity of a network domain other than the internet protocol multimedia subsystem, at least one of the plurality of messages comprises free of charge information and at least one other of the plurality messages comprises information to include a charge; and
a charging block configured to perform a charging in accordance with the charging information, the at least one of the plurality of messages with the free of charge information causing at least one network node receiving the message to disable charging functions for the session by the at least one network node.

14. The network node according to claim 13, wherein the charging block is configured to perform the charging in accordance with the charging information online.

15. The network node according to claim 14, further comprising: a sending block configured to send a credit control request to an online charging system.

16. The network node according to claim 13, the network node comprising a serving call session control function.

17. A method comprising:
detecting whether a session initiated in an internet protocol multimedia subsystem is associated with a service requiring a special charging control, wherein detecting whether the session initiated in the internet protocol multimedia subsystem further comprises detecting whether the session is associated with a call that is switched by an entity of a network domain different from that of the internet protocol multimedia subsystem; and
adding charging information to messages signaling establishment or modification of the session in the internet protocol multimedia subsystem in accordance with a detection result, at least one of the messages comprises free of charge information and at least one other of the messages comprises information to include a charge, wherein at least one of the detecting and the adding are implemented on a physical apparatus;
wherein the at least one of the messages with the free of charge information causing at least one network node receiving the message to disable charging functions for the session by the at least one network node.

18. The method according to claim 17, wherein detecting whether the session initiated in the internet protocol multimedia subsystem further comprises detecting the session initiated in the internet protocol multimedia subsystem being associated with a voice call continuity service requiring the special charging control.

19. The method according to claim 17, wherein adding charging information further comprises adding charging information comprising parameters introduced to a session initiation protocol signaling.

20. The method according to claim 17, further comprising: transferring the charging information for avoiding overlapping charging in a session initiation protocol signaling.

21. The method according to claim 20, wherein transferring the charging information for avoiding overlapping charging in the session initiation protocol signaling comprises charging information comprising a p-charging parameters heading.

22. A method comprising:
detecting that a received plurality of messages which signal establishment or modification of a session in an internet protocol multimedia subsystem comprises charging information, at least one of the plurality of messages comprises free of charge information and at least one other of the plurality of messages comprises information to include a charge, wherein detecting whether the session initiated in the internet protocol multimedia subsystem further comprises detecting whether the session is associated with a call that is switched by an entity of a network domain different from that of the internet protocol multimedia subsystem; and
performing a charging in accordance with the charging information, wherein at least one of the detecting and the performing are implemented on a physical apparatus;
wherein the at least one of the plurality of messages with the free of charge information causing at least one network node receiving the message to disable charging functions for the session by the at least one network node.

23. The method according to claim 22, wherein performing the charging in accordance with the charging information comprises an online charging.

24. A computer readable medium comprising a computer program which when executed by a processor performs operations comprising:
detecting whether a session initiated in the internet protocol multimedia subsystem is associated with a service requiring a special charging control wherein detecting whether the session initiated in the internet protocol multimedia subsystem further comprises detecting whether the session is associated with a call that is switched by an entity of a network domain different from that of the internet protocol multimedia subsystem; and
adding charging information to messages signaling establishment or modification of the session in the internet protocol multimedia subsystem in accordance with a detection result, at least one of the messages comprises free of charge information and at least one other of the messages comprises information to include a charge;
the at least one of the messages with the free of charge information causing at least one network node receiving the message to disable charging functions for the session by the at least one network node.

* * * * *